(12) United States Patent
Asai (10) Patent No.: US 6,174,487 B1
(45) Date of Patent: Jan. 16, 2001

(54) AIR BLOWING METHOD FOR MOLD FOR A DISK MOLDING AND A MOLD THEREFOR

(75) Inventor: Ikuo Asai, Ohbu (JP)

(73) Assignee: Kabushiki Kaisha Meiki Seisakusho, Ohbu (JP)

(*) Notice: Under 35 U.S.C. 154(b), the term of this patent shall be extended for 0 days.

(21) Appl. No.: 09/247,859

(22) Filed: Feb. 11, 1999

(30) Foreign Application Priority Data

Mar. 19, 1998 (JP) .................................................. 10-070097

(51) Int. Cl.[7] .................................................. B29C 45/43
(52) U.S. Cl. ........................ 264/335; 264/106; 425/437; 425/556; 425/810
(58) Field of Search .................... 264/335, 106, 264/107; 425/810, 556, 437

(56) References Cited

U.S. PATENT DOCUMENTS

| 5,297,951 | * | 3/1994 | Asai | 425/556 |
| 5,316,466 | * | 5/1994 | Tanaka et al. | 425/810 |
| 5,460,763 | * | 10/1995 | Asai | 264/107 |
| 5,593,710 | * | 1/1997 | Asai | 264/107 |
| 5,626,890 | * | 5/1997 | Asai | 425/556 |
| 5,804,229 | * | 9/1998 | Asai | 425/556 |
| 5,882,700 | * | 3/1999 | Asai | 425/556 |

FOREIGN PATENT DOCUMENTS

| 5-177672 | 7/1993 | (JP) . |
| 7-42682 U | 8/1995 | (JP) . |

* cited by examiner

Primary Examiner—Jill L. Heitbrink
(74) Attorney, Agent, or Firm—Oliff & Berridge, PLC (57) ABSTRACT

The stamper 16 is disposed opposing to the cavity 3 formed between the fixed mold 1 and the movable mold 2, as a holding means of the circumference of the stamper the flat type of holding means 17 is provided, and when using this molded product for molding a disk, the air for releasing the mold is blown out from a plurality of air passages into the cavity. The air from the outer circumference side of the disk is blown out from one of the air supply opening provided on at least one of the recessed portion 28 formed on the holding means 17 and the mirror plate 15 opposing to the recessed portion 28 simultaneously, before or after the operation time of opening the mold during the time of restoring stroke of the holding means from being pushed against the resilient means 32 through the gap 30 between the inside projection wall 27 of the holding means 17 and the stamper surface 16a.

2 Claims, 5 Drawing Sheets

AIR BLOWING METHOD FOR MOLD FOR A DISK MOLDING AND A MOLD THEREFOR

BACKGROUND OF THE INVENTION

1. Field of the Invention

The present invention relates to molding a disk for optical recording medium such as a compact disk (CD) and a digital video disk (DVD), in particular an air blowing method at the time of being released from a mold and a mold therefor.

2. Background of Related Art

A mold for producing an optical disk such as CD or DVD forms a cavity between a fixed mold and a movable mold, and in order to fix a stamper to at least one of mirror surfaces facing to the cavity, comprises a structure where a stamper holder for holding the inner and outer edges of the stamper to the mirror surface. And, when a molten resin is filled in the cavity, a bit which is formed concentrically and in concavo-convex manner in section formed on the surface of the stamper is transferred to a molded product to make a disk having an information data.

This molding method comprises a process as well as a general injection molding and is carried out by following processes. That is, a mold is fixed to a molding-machine, and after carrying out a mounting arrangement of the mold, a mold closing process for putting a fixed mold and a movable mold together, a mold clamping process for maintaining a clamping-keeping pressure due to increasing a pressure to the molds put together, an injection and filling process for filling the molten resin in the mold, a pressure keeping and cooling process for controlling an injection keeping pressure and cooling the mold, a mold opening process for retreating the movable mold and a molded product taking out process are carried out to finish a series of molding process. As a mold to be used for molding a disk, there is such a mold structure as disclosed in, for example, Japanese patent laid-open No. Hei 5-177672 and Japanese utility model publication No. Hei 7-42682, and in FIGS. 3–5, a sectional view of a partial portion of these molds and a main portion are disclosed.

Figure 3:
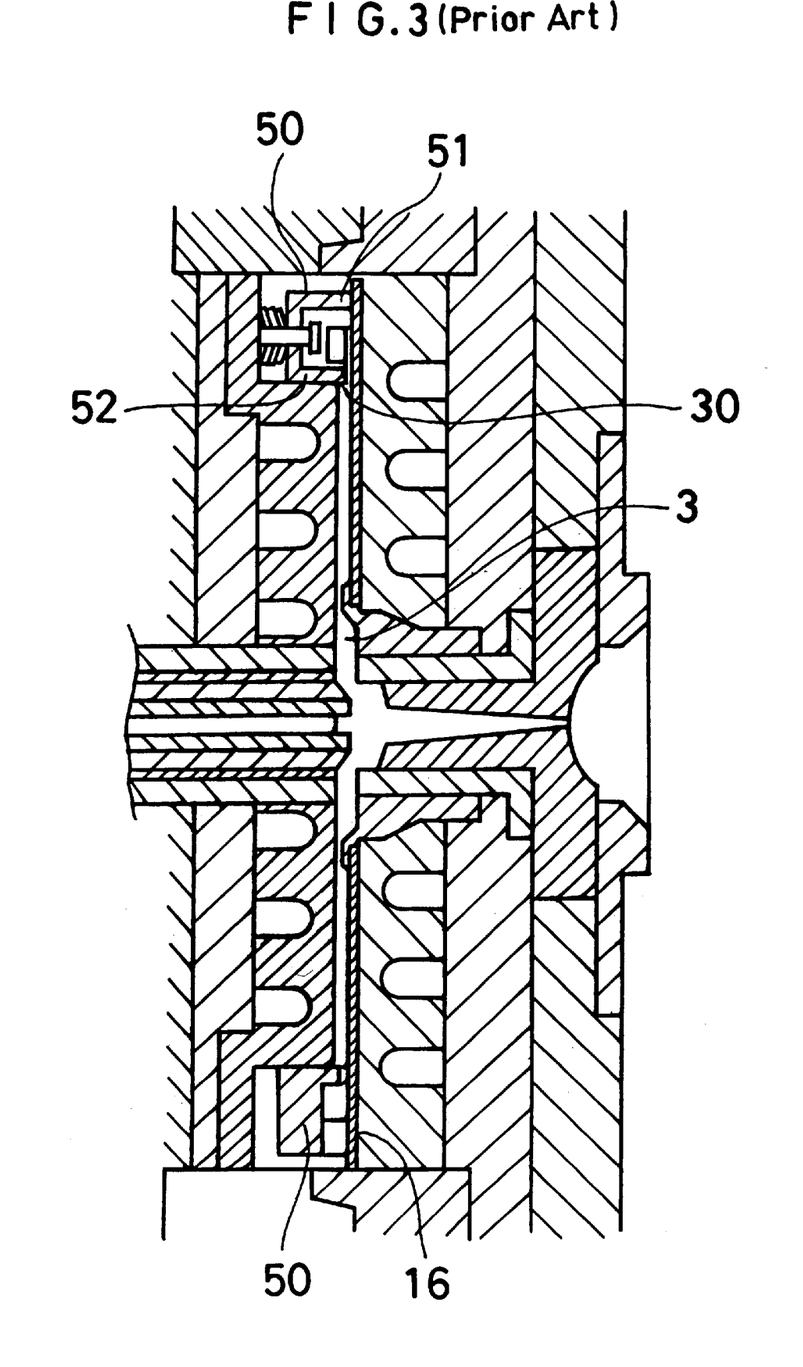
FIG. 3 is a sectional view of a part of a mold for molding a disk in using a conventional flat type of holding means.
Figure 4:
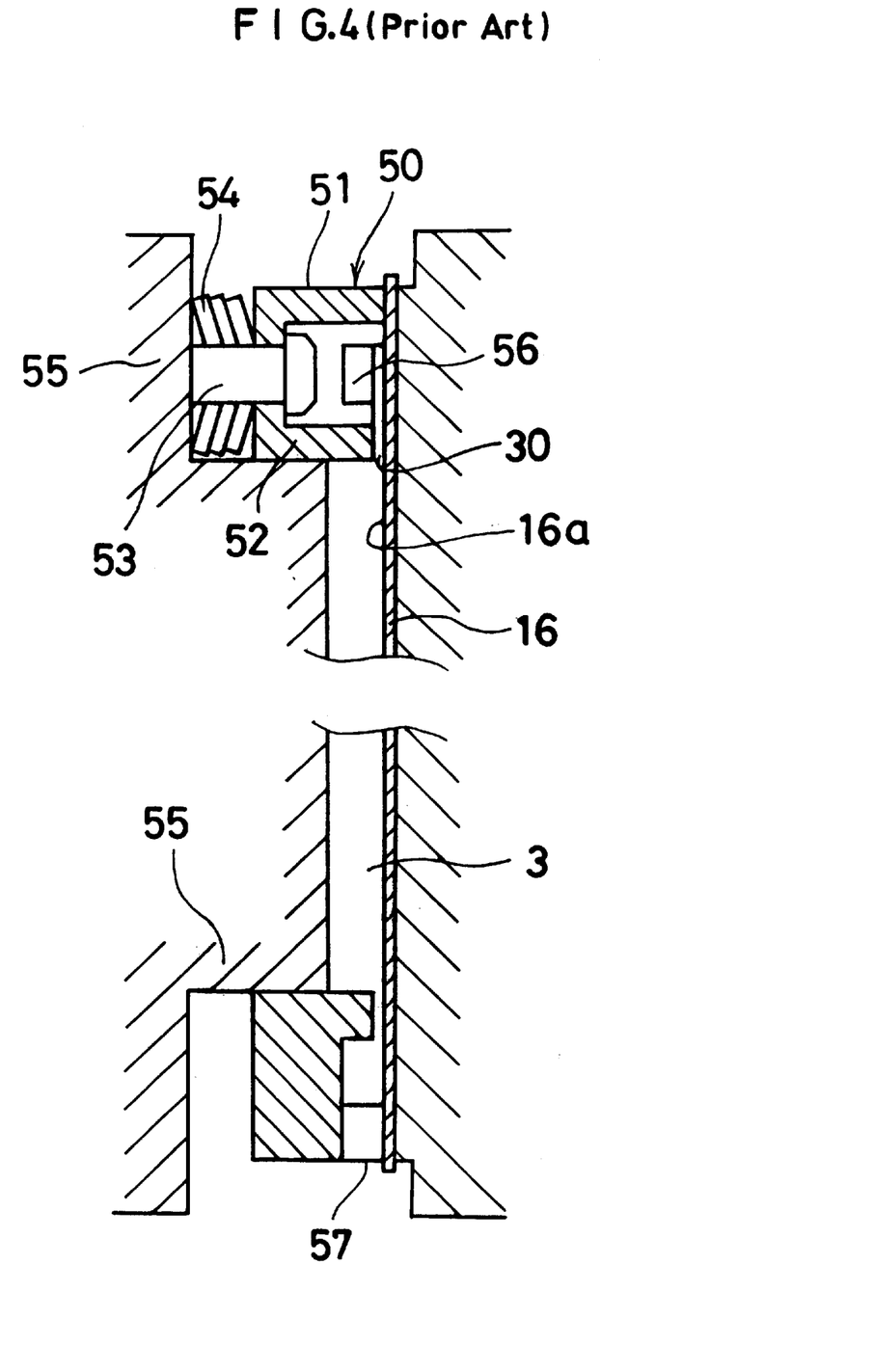
FIG. 4 is an enlarged view of the flat type of holding means in FIG. 3.
Figure 5:
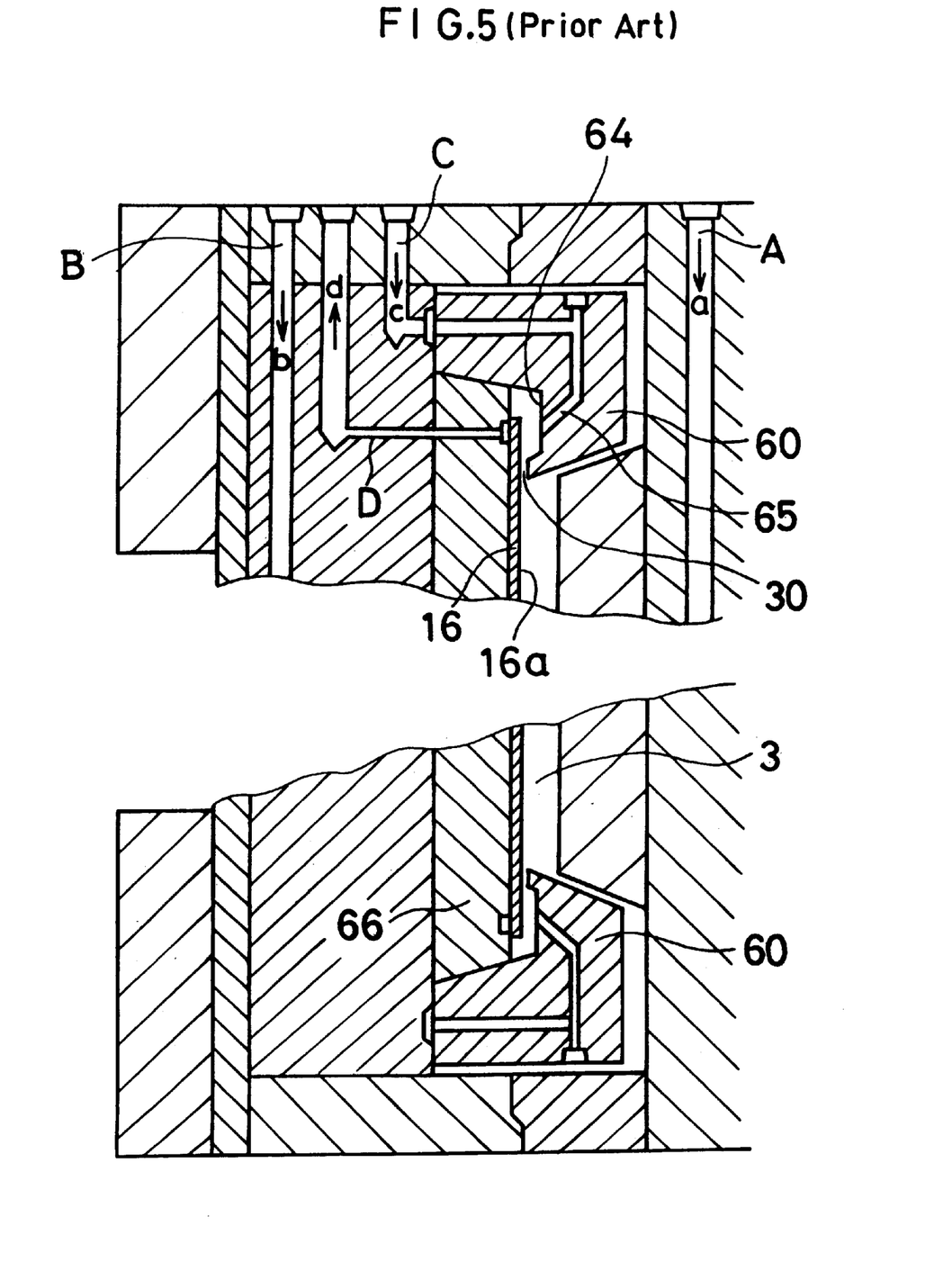
FIG. 5 is a sectional view of a part of a mold for molding a disk in using a conventional push-in type of holding means.

In the two molds mentioned above, a difference with each other resides in the structure for holding the circumference of the stamper. A holding means shown in FIGS. 3 and 4 is a flat type and the one shown in FIG. 5 is a push-in type. The flat type shown in FIG. 3 is structured from an outer ring comprising an inner ring portion, an outer ring portion and a gas exhausting opening, which is mounted through a resilient member on the side of the mirror plate of a mold opposite to the mold on which a stamper is held and disposed in such a manner as it surrounds the cavity while making its outer ring portion get in touch with the stamper surface.

In the explanation referring to reference signs of FIG. 4, it is of a structure in which an outer ring 50 is mounted on the side of a mirror plate 55 of a movable mold through a conical spring 54 by a bolt 53 inserted in a central hole while the outer ring portion 51 abutting a stamper face 16a and forming a gap 30 between the inner ring portion 52 and the stamper 16. Thereby, at the time of closing the mold, the conical spring 54 is compressed on the mirror plate 55 and the outer ring 50 slides on the side surface of the mirror plate 55 along the axial direction of the bolt 53. On the other hand, at the time of opening of the mold, the outer ring 50 moves reversely in the previous direction due to the restreating force of the conical spring 54. This displacing distance is controlled in a given stroke by the length of the bolt and the conical spring 54. Further, the gap 30 between an inner ring portion 52 of the outer ring and a stamper surface 16a is set in its width so as to be passed by a gas but not by a molten resin. Thereby, the gas only in the cavity is adapted to be exhausted through the gap 30, a gas drain groove 56 and a gas drain opening 57.

Further, in a holding means of the push-in type shown in FIG. 5 too is, as well as in the flat type, formed with an outer ring 60 surrounding the stamper. Conventionally, in this type of a disk mold, at the time of releasing the disk from the stamper 16, an air b from an air passage of a movable mold is supplied through the gap between the stamper holder and a sleeve (not shown). However, it is not easy for a disk to be released in one direction from inside to outside due to the resistance of the existence of a concavo-convex configuration of the stamper, and, merely by this air b (air blow) in the inner side, the disk is not released even from a front face of the stamper and, since an air supply to the outer circumference of a disk is delayed and the releasing balance thereof becomes different between the inside and outside of the disk, a boundary pattern like a mist appears on the disk surface to have generated a problem.

However, in the mold shown in FIG. 5, there are an air a blown from an air passage A of a fixed mold toward the bottom side of the cavity and an air b blown from an air passage B of the movable mold toward the stamper side, in addition an air c is adapted to be blown from the outer side of the disk toward inside of the cavity through an air passage C provided so as to blow an air from the outer side of the disk. Whereby, the gap 30 between the outer ring 60 and the stamper surface 16a does not become exclusive for the gas drain like in the flat type and forms one part of the air passage C through which is formed for the air which is supplied from an air passage 65 opened at a concave portion 64 of the outer ring to the inside of the cavity 3. In addition, in the structure of FIG. 5, a vacuum passage D is formed in order to suck an air d for making the outer circumference of the stamper contact tightly to a mirror plate 66.

Accordingly, the airs a and b supplied through the air passages A and B are blown from the inner circumference of the disk outside of the cavity in the radial direction of the cavity and the air c supplied from the air passage C is blown through the outer ring 60 and the gap 30 between a projected portion from the outer ring and the stamper surface 16a toward the inside of the cavity 3 in the radial direction. As a result, a disk is released from the mirror face of the cavity bottom and the stamper face.

Therefore, in the above mentioned mold structure of the push-in type, an air blow is supplied from both sides in the radial direction, and due to this mold structure an even, complete and instant releasing from the stamper and the sticking by sucking the stamper to the mirror face of the movable mold are simultaneously obtained, so that it becomes possible to prevent the stamper from being floated up unevenly from the mirror face and the uneven defect of the stamper surface from being generated to attain an improvement in the air blow method for releasing the disk from the mold.

However, in the flat type of the structure of the mold, the outer ring is not fixed like in the push-in type, the stamper is pushed through a resilient means and the holding means of the outer circumference of the stamper is adapted to be displaced to and fro at every opening and closing of the mold. Further, there is not provided with the vacuum passage for sucking the stamper to the mirror plate. Therefore, in the flat type, it is difficult to join the passages provided in the mold and since the gap between the stamper surface and the inner ring portion is exclusively used for exhausting the gas, an air supply in the reverse direction could not carry out.

In the light of such situation, the purpose of the present invention is to provide an air blow method and a mold thereof in which by making use of the holding means for holding the outer circumference of the stamper in the flat type as a holding means, a good molding of a disk is carried out.

SUMMARY OF THE INVENTION

According to the first aspect of the present invention, in which a method of an air blowing for a mold for molding a disk to attain the above purpose, simultaneously, before or after the time of opening of the mold to be operated with a solidification of a molten resin filled in the cavity, an air for releasing the mold is blown out in the cavity from the inner and outer circumference of a molding through air passages provided in the mold, wherein the air blown out from the outer circumference of a disk is blown from at least one of supplying openings provided in the recessed portion of the holding means and in a mirror plate provided opposing to the recessed portion and through a gap between a wall projected in an inner side of the holding means for an outer circumference of a stamper and the surface of the stamper.

According to the second aspect of the present invention resides in that an air to be blown out through a gap between a wall projected in an inner side of the holding means for a circumference of the stamper and the surface of the stamper is blown out at least from the gap during a stroke of the holding means retreating to the original position, which is sunk against the biasing force of the resilient means due to a closing operation of the mold.

According to the third aspect of the present invention, a mold for molding a disk comprises a main body of a flat type of holding means which is provided with a projected outside wall abutting to a mirror plate of a stamper side, a projected inside wall forming a gap for blowing out an air between it and the surface of the stamper, a recessed portion formed between the projected outside wall and the projected inside wall and a seat portion opened at the bottom side and accommodating a resilient means to bias the main body toward the stamper side, wherein said holding means comprises a stopper means to determine a projected amount by engaging with the outside of the main body in such a manner as the holding means has a stroke length which corresponds to a displacement distance against the resilient means, further passages for supplying the air to release the mold from the outside of the disk comprise at least a communication passage coming through between the recessed portion and the bottom of the holding means so as to be blown out on the surface of the stamper and a communication passage provided on the mold facing to the recessed portion and an outlet opening of which is located on the mirror plate and between the outer edge of the stamper and the outer wall portion of the holding means.

By this constitution, in the present invention, even in the case where the stamper holding means for holding the outer circumstance thereof is of the flat type, since a gap for air blowing out is formed between the projected inside wall of the stamper holding means and the stamper surface, an air for releasing the mold is blown out simultaneously with or, before or after the mold opening operation through the gap from the outer circumference of the disk at least from either one of the recessed portion or the outlet opening of the mirror plate facing to the recessed portion or from both of them. And, this blowing out of the air goes on at least during the retreating of the holding means from the outer circumference side of the disk, and since the air for releasing the mold is supplied from both of the inner and outer sides of the disk, the operation of releasing the mold is effectively carried out.

DETAILED DESCRIPTION OF PREFERRED EMBODIMENTS

Based on the attached drawings, one embodiment of the present invention are explained. First, a mold structure using for a disk molding method of the present invention is shown in FIG. 1 and its main portion is shown in FIG. 2 in by enlarged manner.

Figure 1:
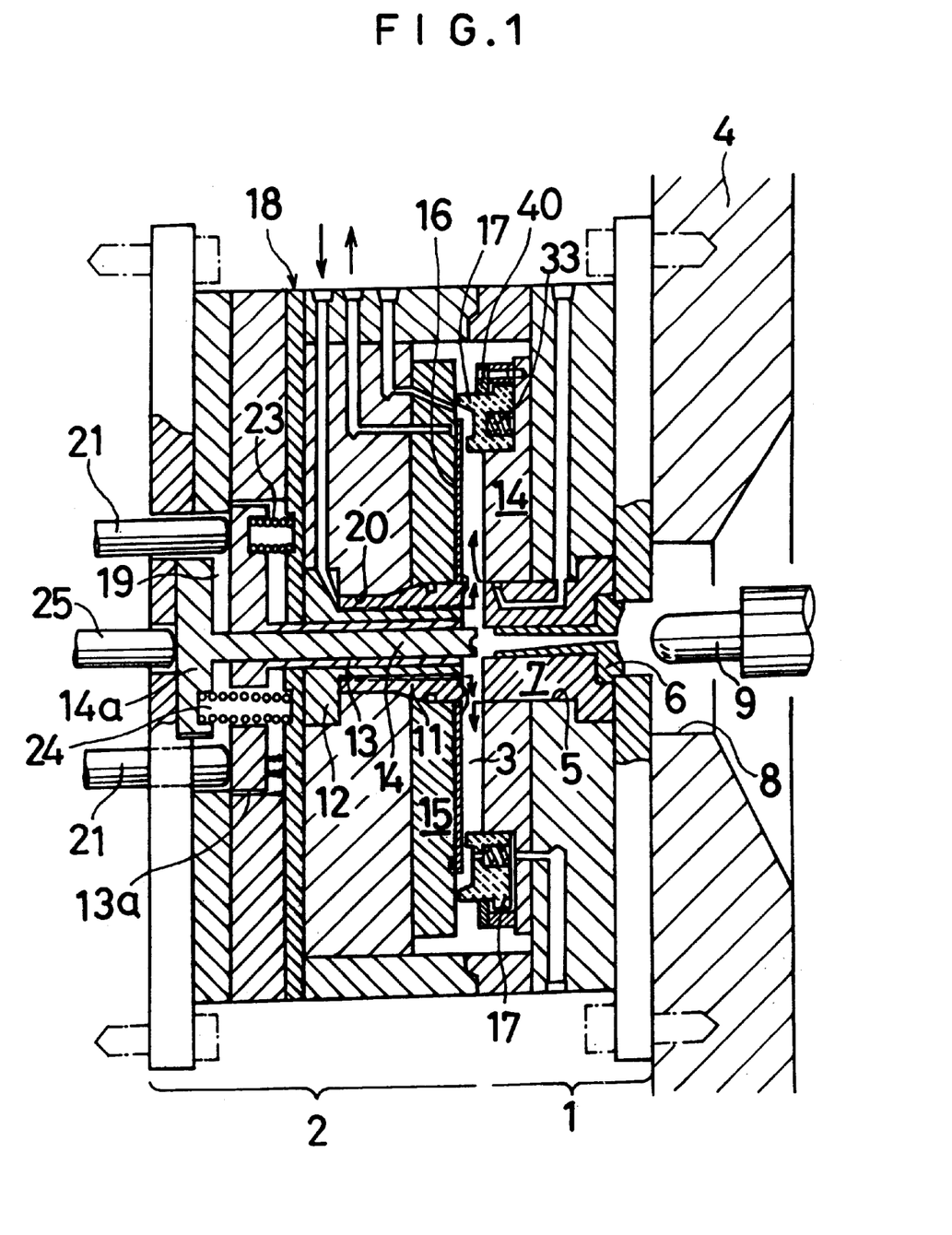
FIG. 1 is a sectional view showing the structure of a disk molding mold for carrying out an air blowing method of the present invention.

In FIG. 1, 1 designates a fixed mold and 2 is a movable mold. Between the fixed mold and the movable mold a cavity 3 is formed. The fixed mold is mounted on a fixed plate 4, the mounting means of which is omitted. A through hole 5 is provided on the center of the fixed mold 1, and in this through hole 5 a female cutter 7 carrying a sprue bush 6 is mounted. On the fixed plate 4 an opening 8 having a tapered portion is formed and through which a nozzle 9 is adapted to be mounted so as to come close to and separate from the sprue bush 6.

The movable mold 2 is mounted on a movable plate not shown is adapted to be free of moving forward and backward for the fixed mold 1. The mounting means for these are not shown. At the center of the movable mold 2 a through hole 20 is provided, in which from outside thereof a stamper holder 11, a fixed sleeve 12 for supporting this holder, an ejector sleeve 13 and a male cutter 14 are disposed concentrically. Here, as the structure of the ejector a mold structure which is disclosed in an Utility Model publication No. Hei 7-42682 is made use of.

Figure 2:
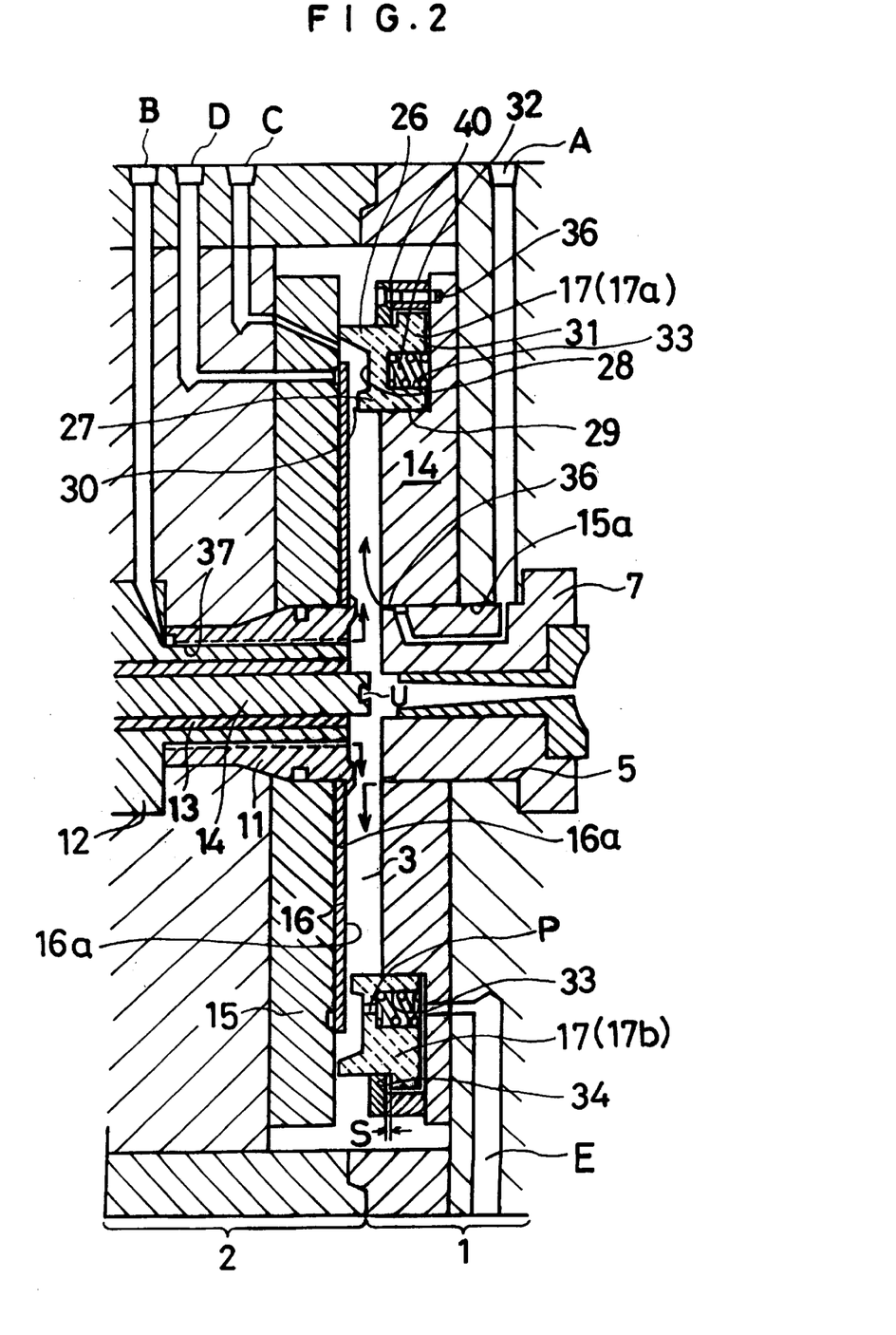
FIG. 2 is an enlarged view of the stamper holding means in section shown in FIG. 1 by illustrating two embodiments depicted in the upper and lower sides respectively.

As shown in FIGS. 1 and 2, on a mirror plate 15 of the movable mold a stamper 16 is located and the inner circumference of which is held by a tip end pawl portion of the stamper holder 11 and the outer circumference edge of the stamper 16 is adapted to be sucked closely to the mirror plate 15 of the movable mold 2 by a vacuum passage D. Further, on the mirror 14 of the fixed mold 1 an outer circumference ring 17 is provided in such a manner as it surrounds and is pushed against the outer circumference portion of the mirror plate 15 of the movable mold 2 by being engaged slidably with the side of the mirror plate 14.

The ejector sleeve 13 has a large diameter 13a in its rear portion, which is disposed slidably in a guide chamber 19 provided in a mold-constitution part 18, and between a front wall of the guide chamber 19 and the front surface of the large diameter 13a compression springs 23 are disposed while biasing them for being separated each other. Behind the large diameter portion 14a, a pair of pins 21, 21 are located, which makes an advancing and retreating action by a driving means and a controlling means (not shown) being formed with such hydraulic apparatus as being able to control a pressure and a flowing amount.

The male cutter 14 comes through the center of the ejector sleeve 13,.and the outer circumference of a tip end of which has a diameter which determines an inside diameter dimension of a disk to be molded and on the tip end portion an under cut portion U is formed. Further, the rear end portion of the male cutter 14 is a large diameter portion 14a which is disposed slidably forward and backward in the guide chamber 19. Between the large diameter portion 14a of the male cutter and the mold-constitution part 18 a compression spring 24 is accommodated to bias the male cutter 14 rearward. On the rear surface of the large diameter portion 14a a projection member 25 is positioned and which makes an action of advancing and retreating by a driving means and a controlling means (not shown) being formed with such hydraulic apparatus as being able to control a pressure and a flowing amount. Thereby, the ejector apparatus is constituted in such a manner as, after the large diameter portion 14a of the male cutter 14 advances by being pushed by the driving of the projection member 25 and forms the inside diameter of the disk by cutting, the large diameter portion 14a abuts against the large diameter portion 13a of the ejector sleeve 13, and the ejector sleeve 13 advances and the molded disk is pushed out.

FIG. 2 is a sectional view showing a main portion of FIG. 1 which depicts two kinds of the holding means upper and lower, and a plurality of air passages for supplying air into the cavity 3 and the flat type of holding means constituting the outer ring 17 as a stamper holding means are shown. The air passages are, as well as the case where the push-in type holding means is employed, provided in plurality in the fixed and movable molds.

The air passage A of the fixed mold side is in communication with an annular gap 36 formed at a boundary between the center through hole 15a of the mirror plate 14 and the outer circumference of the female cutter 7 and an air is blown out from the bottom side of the cavity and the air passage B of the movable mold side is in communication with a gap 37 opened into the cavity along the wall of the central hole of the stamper holder 11 and blows out an air into the inside circumference of the cavity. In addition, as passages for blowing out air later mentioned passages C and E are there. And, besides these passages, a vacuum passage D for making the outer circumference of the stamper 16 to contact closely to the mirror plate 15 of the fixed mold 2 is provided.

As a holding means in FIG. 2, there are two types and either one is used. One is an annular outer-circumference ring 17a (upper in FIG. 2) surrounding the outer circumference portion of the surface of the mirror plate 15 of the fixed mold 2, which constitutes a cavity closing ring for maintaining an inner pressure of the cavity. The other one is, together with this closing function, an annular outer-circumference ring 17b (shown lower in FIG. 2) which is in communication with the air passage E from the fixed mold 1 and for forming a passage for supplying an air for releasing the mold from the outer circumference side of the disk. For reference, here, although the stamper 16 is explained as what is mounted on the movable mold 2 and the holding means is what is mounted on the fixed mold 1, if in the case where the stamper 16 is mounted on the fixed mold 1, the holding means is mounted on the movable mold 2 positioned opposite to the stamper 16.

The annular circumference-rings 17a or 17b (hereinafter if two rings are mentioned commonly, these are called merely in reference of sign 17) as a holding means body are commonly in engagement with the side of the mirror plate 14 of the fixed mold 1 mounted on it forward and backward slidably in the direction of opening and closing the molds with a later-mentioned stopper. The outer circumference ring 17 is provided with an outer projection wall 26 on its outer circumference which gets in touch with the mirror plate 15 of the stamper side, an inner projection wall 27 which forms a gap 30 between such wall 27 and the surface of the stamper 16 for blowing out an air and a recessed portion 28 which is formed between the outer projection wall 26 and the inner projection wall 27. And, on a bottom side a seat portion 33 which opens toward the bottom portion 31 and accommodates a coil spring 32 (resilient means), by the repulsion force of which the outer circumference ring 17 is pushed against the mirror plate 15 of the movable mold 2. This seat portion 33 is provided in a plurality number around the outer circumference at a given interval and each of them accommodates one coil spring respectively.

Further, on the outside of the outer circumference ring 17, along the outer projection wall 26 a stepped potion 34 is formed and a stopper member (stopper means) 40 which engages with the stepped portion is mounted on the mirror plate 14 of the fixed mold 1 through a bolt 36. This stopper member 40 is determined in its height dimension from the surface of the mirror plate 14 on which the stopper is mounted in such a manner as it corresponds at least to the displacing distance of the outer circumference ring 17 due to the spring force. Normally, the stroke length S which is formed between the stepped portion 34 and the stopper 40 is approximately 1 mm.

The displacement amount of the outer circumference ring limited by the stopper member 40 means a retreating stroke from the position pushed at the closing time of the molds, that is, it means a projection amount indicated by S, and even at the time of opening the molds during this retreating stroke, since the outer projection wall 26 of the outer circumference ring 17 is pushed against the mirror plate 15, the cavity is kept in closing. Thereby, during this approximate 1 mm stroke, the blowing out air functions effectively for use of releasing the molds, and is supplied through the gap 30 between the inner circumference projection wall 27 and the stamper 16 into the cavity 3.

At the time of closing the molds, the gap 30 which is formed between the inside projection wall 27 of the outer circumference ring 17 and the stamper 16 is adapted to be, in general, 5–15 μm for such as CD and DVD. In the molds of this invention, it is adapted to be used for exhausting passage for the gas to escape into the recessed portion of the outer circumference ring at the time of filling a molten resin in the cavity, on the other hand at the time of releasing the molds after molding process, it becomes a supplying opening for an air blown out from the outer circumference side of a disk. Further, an engaging face between the outer circumference ring 17 and the mirror plate 14 of the fixed mold 1 becomes a sliding surface of the holding means and forms an air drain passage 29.

In the case where the outer circumference ring 17a shown upper in FIG. 2 is used, the movable mold 2 is provided with an air passage (communication passage) C, which opens on the surface of the mirror plate 15 exposed between the outer edge of the stamper 16 and the outer projection wall 26 of the holding means and faces to the recessed portion 28 of the holding means. And, further, in the case where the outer circumference ring 17b shown lower in FIG. 2 is used, other than the constitution of the above holding means body, a communication passage P for blowing an air on the surface of the stamper 16 passing the seat portion 33 opened to the bottom and through between the recessed portion 28 and the seat portion 33. In addition, an air passage E for air blowing out which is extended from the side of the fixed mold 1 and becomes in communication with this passage P is provided.

Next, using a mold for a disk provided with a flat type of holding means of the above constitution, an air blowing method for releasing the disk from the molds is explained according to the order of the process.

Initially, the molds constituted as mentioned above are mounted on an injection molding machine, all of preparation steps including an opening and closing stroke arrangement and setting of molding conditions and the like are carried out. Through these preparation steps, a molding process starts due to a given molding cycle and a molten resin is filled in the cavity to mold a disk. And, in order to release the disk from the mold, simultaneously with the molds opening operation, an air blowing starts.

The supply of the air blow starts simultaneously with the mold opening operation or before or after that, and normally just before the mold opening operation. The air from the air passage A is supplied through between the female cutter 7 and the mirror plate 14 on the fixed mold side of the disk surface, and the rear side of the edge of the outer circumference of the stamper 16 is made stick to the mirror plate 15 of the movable mold 2 through the vacuum passage D, and the air from the air passage B is supplied through between the stamper holder 11 and the fixed sleeve 12 on the movable mold side of the disk surface. Thereby, the air is blown out from the inside circumference of the disk in the radial direction of the cavity toward outside along both sides of the disk.

On the other hand, the air from the air passage C is blown out from the outlet opening of the mirror plate 15 facing the recessed portion 28 of the outer circumference ring 17a and the air from the air passage E is blown out from the recessed portion 28 through the communication passage P which comes through the outer circumference ring 17b, and at least one of the air blows is blown out from the outer circumference side of the disk inward in the radial direction of the cavity through the gap 30 between the inside projection wall 27 of the holding means and a surface 16a of the stamper 16.

Thus, the blown out air from the outer circumference side of the disk is carried out from at least one of the passages C and E and the blown out air from the inside circumference of the disk is carried out by blowing air to both sides of the center portion of the disk from the passages A and B, thereby, the disk is made peel off from the mirror plate 14 of the fixed mold and the stamper 16 in the direction from its central portion toward the outer circumference edge, and simultaneously from the outer circumference edge too the disk peels off in the direction toward the central portion, as a result air becomes prevalent instantly on the disk surface.

Further, since the outer circumference edge of the stamper 16 is pushed against the mirror plate 15 of the movable mold by the air blown out from the recessed portion of the outer circumference ring through the air passage E and in addition, it is sucked to the mirror plate 15 by the vacuum passage D located opposite to the passage E, the stamper 16 is secured to contact tightly to the mirror plate 15. So that, the air supplied from the air passage C is prevented from entering between the stamper 16 and the mirror plate 15, and further, at the time of releasing the molds the stamper 16 is prevented from being drawn by the disk and floating up irregularly from the mirror surface.

As obvious from the above explanation, according to the air blow method of the present invention, the air passing the gap between the stamper and the outer circumference ring is blown out from the supply opening provided on at least one of the recessed portion of the holding means and the mirror plate facing to the recessed portion, the disk is completely and instantly peeled off from the stamper without being influenced by the concavo-convex configuration of the stamper side to prevent any stain defect from being generated at the time of disk releasing. And, by using the molds for disk molding which can carry out the above method a disk having a high precision can be manufactured.

What is claimed is:

1. An air blowing method for releasing a molded product from a mold to produce a disk, the mold including a first mold and a second mold disposed opposite the first mode, a cavity formed between the first and second molds, the first mold including a mirror plate and a stamper disposed on the mirror plate facing the cavity by a holding means for holding the stamper, the holding means mounted on the second mold and including a recessed portion, a resilient means for biasing the holding means to the mirror plate and an inside projection wall, comprising the step of:

blowing out air for releasing the product through air passages provided in the molds simultaneously, before or after the beginning of an opening operation of the molds to be carried out with solidification of a molten resin filled in the cavity, wherein the air blown out from an outer circumference of the disk is blown out from a supply opening provided on at least one of the recessed portion of the holding means and the mirror plate through a gap between the inside projection wall of the holding means and the surface of the stamper; wherein air blown out from the outer circumference of the disk is blown out at least during a time of retreating stroke by a displacement distance of the holding means caused by being pushed be the mirror plate against a biasing force of the resilient means.

2. A mold for molding a disk, the disk having an inside and an outside, comprising:

a fixed mold and a movable mold;

a cavity formed between the fixed mold and the movable mold;

a mirror plate provided as part of one of either the fixed mold or the movable mold;

a stamper having an outer circumference disposed on the mirror plate facing the cavity formed between the fixed mold and the movable mold;

a holding means disposed on the other of either the movable mold or the fixed mold for holding the outer circumference of the stamper;

a plurality of air passages for blowing air from the inside and the outside of the disk to be formed in the cavity;

the holding means including:

the main body;

a bottom side;

an outer projection wall provided on the main body abutting the mirror plate;

an inside projection wall spaced from the surface of the stamper so as to form a gap for blowing out air;

a recessed portion formed between the outer projection wall and the inside projection wall;

a seat portion opened toward the bottom side and accommodating a resilient means for biasing the holding means to the mirror plate through a biasing force; and a stopper means for determining a projection amount of the holding means while engaging with the main body in such a manner that the holding means has a stroke-length corresponding to the distance by the holding means by being pushed by the resilient means against the stopper means;
the plurality of the air passages including:
at least one of communication passages which comes through between the recessed portion of the holding means and the bottom side of the holding means and another of communication passages of which is formed on the mirror plate and between the outer circumference of the stamper and the outer projection wall of the holdings means.

* * * * *